United States Patent [19]

Ross et al.

[11] 3,970,801

[45] July 20, 1976

[54] DIALING APPARATUS FOR A PORTABLE RADIO TELEPHONE

[75] Inventors: Danny E. Ross, Plantation; James M. Mueller, Margate, both of Fla.

[73] Assignee: Motorola, Inc., Schaumburg, Ill.

[22] Filed: Dec. 3, 1974

[21] Appl. No.: 529,020

[52] U.S. Cl............................ 179/41 A; 179/84 VF
[51] Int. Cl.² ........................................ H04M 1/50
[58] Field of Search...................... 179/41 A, 84 VF; 325/16

[56] References Cited
UNITED STATES PATENTS

| | | | |
|---|---|---|---|
| 2,986,603 | 5/1961 | Meacham | 179/17 A |
| 3,064,084 | 11/1962 | Meacham | 179/84 VF |
| 3,087,999 | 4/1963 | Stewart et al. | 179/84 VF |
| 3,284,577 | 11/1966 | Burns et al. | 179/84 VF |
| 3,345,466 | 10/1967 | Rahmig | 179/84 VF |
| 3,784,759 | 1/1974 | Haight et al. | 179/84 VF |
| 3,824,465 | 7/1974 | Blough | 325/16 |

Primary Examiner—Douglas W. Olms
Attorney, Agent, or Firm—James W. Gillman; Eugene A. Parsons

[57] ABSTRACT

This apparatus is especially useful as a conversion kit and includes a new front cover for a portable radio telephone having a plurality of push buttons mounted therein, which push buttons activate a tone generator, the tones from which are applied to a timer and through a multi-contact relay to the speaker and transmitter of the radio telephone. The timer is utilized to activate the relay for 90 milliseconds each time a tone is produced by the tone generator so that a tone is transmitted for only 90 milliseconds and when a tone is not being generated the transmitter is connected to a microphone and the speaker is connected to the receiver in the normal operating manner by the relay.

5 Claims, 2 Drawing Figures

DIALING APPARATUS FOR A PORTABLE RADIO TELEPHONE

BACKGROUND OF THE INVENTION

Portable radios with telephone dialing apparatus of the type described herein are generally used in Radio Common Carrier Operations wherein the portable radios are generally leased to subscribers. In a typical system a plurality of portable radios have the capability of communicating with a base station, which base station may be connected to one or more telephone lines for communication with substantially any telephones. In operation the subscriber contacts the base station through his portable radio and, if the portable radio does not have telephone dialing apparatus, the subscriber must ask the base station for the particular telephone number he desires. Presently, portable radios in Radio Common Carrier Operations of this type have dialing apparatus but it is generally, extremely complex and requires substantial modifications to the portable radio to incorporate the dialing apparatus therein. Further, many of the prior art types of dialing apparatus are subject to misinterpreted dialing signals and do not provide audible tones or signals to apprise the operator of the fact that he has successfully dialed a number. This is especially true in assemblies designed to provide tones in response to the depressing of buttons.

SUMMARY OF THE INVENTION

The present invention pertains to improved telephone dialing apparatus for use in a portable radio wherein a plurality of push button switches are mounted in the housing of the radio and are connected to tone generating means which provide a predetermined pair of a plurality of tones in response to the depressing of each of the buttons, which tones are applied to a timer that in turn controls switching means to disconnect a microphone from the transmitter and apply the tone thereto and disconnect an audio transducer from the receiver and apply the tone thereto, for a predetermined period of time after the beginning of a tone from the tone generating means.

It is an object of the present invention to provide improved telephone dialing apparatus which may easily be incorporated into a portable radio and which provides reliable push button dialing while providing the operator with an audible indication of the dialing.

This and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
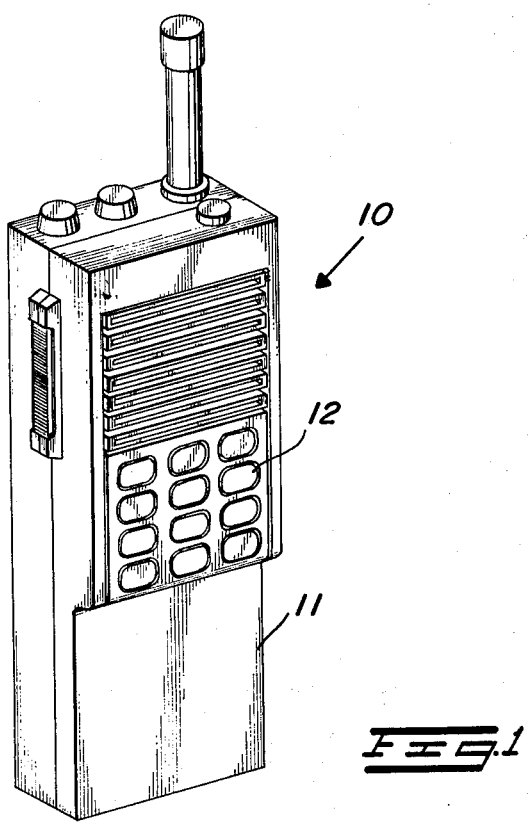
FIG. 1 is a view in front elevation of a portable radio incorporating push button dialing apparatus embodying the present invention.

Referring specifically to FIG. 1, a portable radio, generally designated 10, is illustrated. The radio 10 has a hard plastic housing with a front cover 11 incorporating a multi-button device 12. The multi-button device 12 includes a plurality (in this embodiment 12) of regularly spaced push buttons which are incorporated as an integral portion of the front cover 11. A complete description of the construction and operation of the multi-button device 12 is disclosed in a co-pending application entitled "Electrical Switch Assembly and Connecting Link," Ser. No. 532,541, Filing Date Dec. 13, 1974 and assigned to the same assignee. By forming the multi-button device 12 as an integral portion of the front cover 11, the radio 10 can be quickly and easily modified to provide the present push button telephone dialing apparatus therein with substantially no modifications to the radio 10, except the exchange of the front cover 11 and several internal electrical connections which will be explained presently. The entire electrical structure, to be described, is mounted on a printed circuit board, which is actually incorporated as a portion of the multi-button device 12 described in the above-mentioned co-pending application, and easily fits within the radio 10 without substantially increasing the size or weight thereof.

Figure 2:
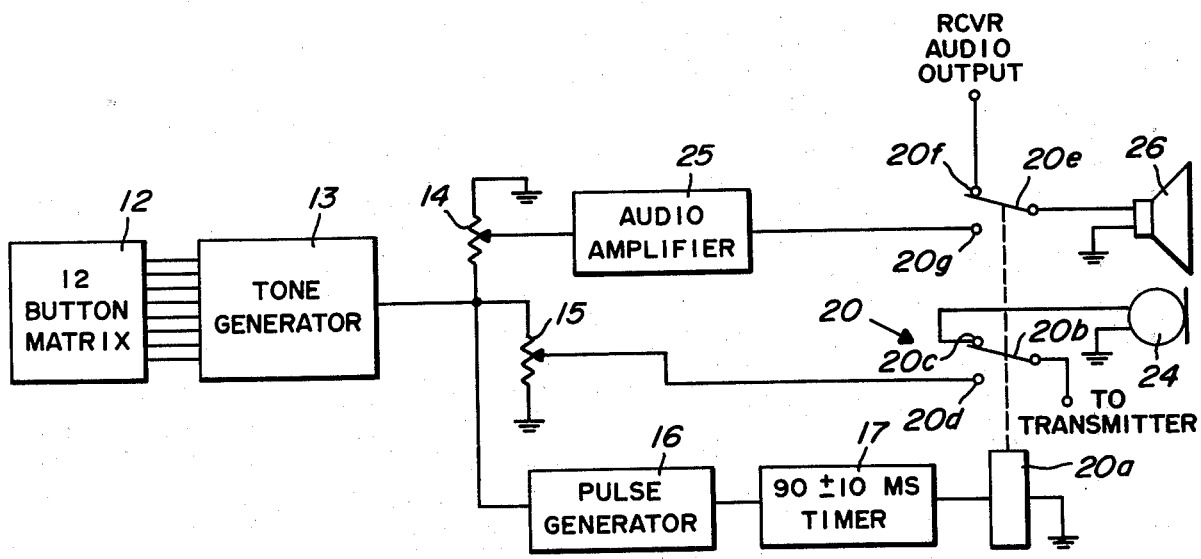
FIG. 2 is a block diagram of the push button dialing apparatus incorporated in the portable radio of FIG. 1.

Referring specifically to FIG. 2, the multi-button device 12 is illustrated as a 12 button matrix having 8 output leads connected to 8 inputs of a tone generator 13. The tone generator 13 may be any generator which will provide the desired tone from a plurality of control inputs, such as the commercially available microelectronic tone generator MH8900, manufactured by Microsystems International Limited. In the present embodiment the tone generator 13 is capable of providing a high tone and a low tone output, one each of which is combined to provide a desired tone-pair whenever a button in the push button device 12 is depressed. In this manner, 12 desired tone-pairs are obtained which correspond with the 12 buttons in the matrix of the push button device 12. It should of course be understood that matrixing the 12 buttons into 8 leads and utilizing the specific tone generator described is only one embodiment of the present invention and those skilled in the art may devise a variety of apparatus for performing this function.

The output of the tone generator 13 is applied to one end of a first potentiometer 14, the other end of which is grounded, one end of a second potentiometer 15, the other end of which is grounded, and a pulse generator 16. When a tone is provided at the output of the tone generator 13, the pulse generator 16 senses the beginning of the tone and provides a single pulse at the output of the pulse generator 16. In the present embodiment the output of the tone generator 13 is normally at 13.5 volts and, whenever a tone is provided by the tone generator 13, the average output voltage drops to approximately 6 volts so that the pulse generator 16 senses the relatively sharp drop in the average voltage output of the tone generator 13. The pulse generator 16 utilizes this sharp drop and, by integration or the like, provides a sharp negative pulse which indicates the beginning of a tone from the tone generator 13. It will of course be understood by those skilled in the art that any type of pulse, including a step function or the like, which indicates the beginning of a tone from the tone generator 13 may be utilized.

The output of the pulse generator 16 is applied to an input of a timer 17 which, upon actuation thereof, energizes switching means, which in this embodiment is a relay generally designated 20 with a coil 20A connected to the output of the timer 17. A first movable contact 20B, of the relay 20, is normally engaged with a stationary contact 20C and moves into engagement with a second stationary contact 20D upon energization of the coil 20A. A second movable contact 20E is normally engaged with a stationary contact 20F and moves into engagement with a second stationary contact 20G upon energization of the coil 20A. The stationary contact 20D is connected directly to a movable contact of the potentiometer 15. The stationary contact 20C is connected directly to a microphone and the movable contact 20B is connected to the input of the transmitter (not shown) of the radio 10. The stationary contact 20G is connected through an audio amplifier 25 to a movable contact of the potentiometer 14. The stationary contact 20F is connected to the audio output of the receiver (not shown) of the radio 10 and the movable contact 20E is connected to an audio transducer, which in this embodiment is a speaker 26.

In the operation of the above-described circuitry, with no tones supplied by the tone generator 13 the relay 20 is de-energized and the microphone 24 is connected to the input of the transmitter of radio 10 and the speaker 26 is connected to the audio output of the receiver. When it is desired to place a call, the radio subscriber contacts the base station, either by voice to the operator or by depressing a button or sequence of buttons on push button device 12, the tone outputs of which are decoded by the telephone line interconnect equipment which interprets this electronically as a request for phone line access to gain access to a phone line. Once a phone line is available the subscriber begins to depress the correct buttons of the push button device 12 corresponding with the desired number. When the first button is depressed the tone generator 13 is activated to provide a predetermined tone-pair corresponding with the button depressed. At the beginning of the tone-pair from the tone generator 13, the pulse generator 16 supplies a pulse to the timer 17 which activates the relay 20 for a predetermined period of time. In the present embodiment the timer 17 is a NE/SE 555 monolithic timing circuit manufactured by Signetics, Inc. which, upon receiving a sharp negative pulse at the input provides a signal at the output sufficient to activate the relay 20 for a period of approximately 90 milliseconds. 90 milliseconds is the standard period recommended in AT&T specifications so that a proper interface will be provided with the telephone system. In general, the tone-pair must be 50 milliseconds long to be detected by the telephone apparatus and it should be limited to 90 milliseconds plus or minus 10 milliseconds since an unduly long tone-pair might look like more than one tone-pair to the telephone system if fading or other interference should occur in the center thereof. If the tone-pair is limited to approximately 90 milliseconds and fading occurs in the radio signals, the tone will generally appear to the telephone system as a single tone-pair with possibly a shorter portion thereafter to which the telephone system will not react.

Thus, with the issuance of the first tone-pair from the tone generator 13 the relay coil 20A is energized and the movable contacts 20B and 20E move into engagement with the stationary contacts 20D and 20G for a period of approximately 90 milliseconds. The timer 17 is designed so that it is activated for 90 milliseconds with the first pulse applied thereto and any additional pulses applied during the 90 milliseconds will have no effect thereon. Further, even though the tone generator 13 is still supplying the tone-pair after the 90 millisecond period the timer 17 will be deactivated and the relay 20 will also be de-activated. Therefore, during the 90 millisecond period that the relay 20 is energized the desired amplitude of the tone-pair is supplied from the movable contact of the potentiometer 15 to the transmitter. Further, the desired level of the tone is supplied from the movable contact of the potentiometer 14 through the audio amplifier 25 to the speaker 26. Thus, for the duration of the predetermined period a tone is applied to the transmitter and also to the speaker so that the operator receives an audible feedback to confirm the fact that he has correctly depressed one of the buttons of the push button device 12. Further, the microphone is disconnected from the transmitter during this 90 millisecond period so that ambient noises can not be applied to the transmitter and the possibility of misinterpretation at the telephone line interconnect is greatly reduced. At the end of the 90 millisecond period the timer 17 is de-activated, the relay 20 is de-activated and the tone generator is disconnected from the speaker 26 and the transmitter. The timer 17 is not activated again until the depressed button in the push button device 12 is released and the same or another button is depressed, resulting in the above sequence being repeated.

Thus, a push button telephone dialing apparatus for portable radios is disclosed which can be easily incorporated into portable radios by simply exchanging the front cover thereof and electrically connecting the receiver audio output, transmitter audio input, and battery voltage potential lines. Further, the dialing apparatus provides tones of a predetermined time duration and mutes the microphone during transmission of the tones to greatly reduce the possibility of misinterpretation at the telephone line interconnect. In addition to these advantages, the dialing apparatus provides an audible tone to assure the subscriber that he has dialed a number and that the apparatus is operating.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In a portable radio including a transmitter/receiver with a microphone and audio transducer, the improved pushbutton telephone dialing apparatus comprising:
   a. tone generating means having a plurality of control inputs and an output, said tone generating means providing a predetermined one of a plurality of tones in response to each of a plurality of control signals on the plurality of control inputs;
   b. a multibutton device coupled to the plurality of control inputs of said tone generating means for providing any of the plurality of control signals in response to the activation of predetermined buttons of said multibutton device;
   c. pulse generating means having an input connected to the output of the tone generating means and an output for sensing the beginning of a tone from the tone generating means and providing a single pulse at the output in response thereto;

d. a timer having an input coupled to the output of said pulse generating means and having an output, said timer providing a signal of a predetermined duration on the output thereof in response to each pulse produced at the output of said pulse generating means;

e. switching means coupled to the output of said timer and being activated for the predetermined duration in response to a signal thereon, said switching means normally coupling the microphone to the transmitter and the audio transducer to the receiver and said switching means, upon activation thereof, disconnecting the microphone and coupling the audio transducer and the transmitter to the output of said tone generating means.

2. The improved dialing apparatus as claimed in claim 1 wherein the output of the tone generating means is applied to two tone level adjustment circuits, one of which is coupled through an audio amplifier and the switching means to the audio transducer and the other of which is coupled directly through the switching means to the transmitter.

3. The improved dialing apparatus as claimed in claim 2 wherein the two tone level adjustment circuits include a pair of potentiometers the main resistance elements of which are connected in parallel.

4. The improved dialing apparatus as claimed in claim 1 wherein the timer provides a signal having a predetermined duration of approximately 80 to 100 milliseconds.

5. The improved dialing apparatus as claimed in claim 1 wherein the portable radio includes a housing and the multibutton device is provided integrally therein.

* * * * *